United States Patent Office 3,511,911
Patented May 12, 1970

3,511,911
INSECTICIDAL AND ACARICIDAL
COMPOSITION AND METHOD
Llewellyn W. Fancher, Lafayette, and David J. Brodbent,
San Jose, Calif., assignors to Stauffer Chemical Company, New York, N.Y., a corporation of Delaware
Original application Oct. 21, 1965, Ser. No. 500,193, now
Patent No. 3,420,918. Divided and this application
Aug. 30, 1968, Ser. No. 801,878
Int. Cl. A01n 9/36
U.S. Cl. 424—211                    12 Claims

ABSTRACT OF THE DISCLOSURE

This invention relates to phosphorodithioyl compositions and their use as insecticides and acaricides.

---

This application is a division of copending application Ser. No. 500,193, filed Oct. 21, 1965, now U.S. Pat. No. 3,420,918.

This invention relates to certain new and novel organic compounds which may be used as effective pesticides. More specifically, this invention relates to certain substituted carbamate acetamide phosphates and phosphonates and to the use of said compounds in effective insecticidal and acaricidal compositions.

The compounds comprising the instant class correspond to the general formula

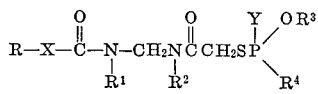

wherein X and Y are selected from the group consisting of oxygen and sulfur; R is a member selected from the group consisting of lower alkyl, lower alkenyl, lower alkynyl, naphthyl, phenyl, substituted phenyl, wherein said substituents are selected from the group consisting of halogen, lower alkoxy, nitro, lower alkyl; bornyl, isobornyl, cyclohexyl, lower alkoxy-alkyl, N-phthalimidomethyl and S-substituted-thioethyl wherein said substituents are selected from the group consisting of lower alkyl, phenyl, naphthyl, halophenyl and alkyl phenyl; $R^1$ and $R^2$ are selected from the group consisting of hydrogen, lower alkyl, phenyl, lower alkenyl and lower alkynyl; $R^3$ is lower alkyl, and $R^4$ is lower alkoxy or lower alkyl. By lower alkyl and lower alkoxy we mean those members of said groups containing from 1 to 10 carbon atoms, inclusive; by lower alkenyl and lower alkynyl we mean those members of said groups containing double and triple bonds, respectively, and containing from 2 to 10 carbon atoms, inclusive. Also included herein is a method of preparing, using and applying said compositions.

The compounds herein contemplated can be prepared by several methods. One such general method applied in preparing the compounds was the condensation reaction between the appropriate substituted carbonylmethyl chloroacetamide and the requisite ammonium or alkali metal dialkyl phosphoro or phosphono thioate or dithioate. The free phosphoric or phosphonic acid may be used also. The intermediate substituted carbamoylmethyl chloroacetamide may be prepared from the appropriate carbamic acid ester or thioester and the appropriate 2-chloro-N-(hydroxymethyl)acetamide, either unsubstituted or further N-substituted with $R^2$, defined supra. The reaction proceeds readily in the liquid phase. The employment of an inert organic solvent is also useful, facilitating processing as well as agitation of the reactants. Solvents such as benzene, toluene, acetone, methylethyl ketone and the like may be employed. When the free phosphorus-containing acid is used the presence of a hydrogen halide acceptor such as sodium carbonate, triethylamine, pyridine, picoline and the like may be used as a catalyst. The reactions may be carried out at temperatures that permit operation in the liquid phase and which are between room temperature and reflux temperature of the solvent, if one is employed. Preferably the reaction mixture is refluxed, usually at an elevated temperature.

It has been found that the compounds of the present invention are particularly effective as insecticides and acaricides.

The compounds of the present invention may be made in accordance with the following examples.

EXAMPLE 1

Preparation of ethoxycarbamylmethylacetamido-O,O-diethylphosphorodithioate

To 11.7 g. (0.06 M) of ethoxycarbamoylmethyl chloroacetamide (previously prepared from the ethyl ester of carbamic acid and 2-chloro-N-(hydroxymethyl) acetamide) and 16.2 g. (0.08 M) of ammonium-O,O-diethylphosporodithioate was added 75 cc. of acetone. The mixture was stirred and refluxed for two hours. The precipitated ammonium chloride was filtered off and the acetone removed from the organic portion on a steam-bath with an air-jet. The residual organic liquid was dissolved in benzene, washed twice with water, dried over anhydrous magnesium sulfate, filtered, and the solvent evaporated. There was obtained 18.6 g. (90 percent of theory) of light yellow viscous liquid, $n_D^{30}=1.5218$. Analysis for the title compound—calculated (percent): N, 8.13; S, 18.60; P, 9.01. Found (percent): N, 7.90; S, 19.08; P, 9.48.

EXAMPLE 2

Preparation of phenoxy-N-methylcarbamylmethyl-acetamido-O,O-diethylphosphorodithioate By an analogous procedure to Example 1, 12.9 g. (0.05 M) of phenyl-N-methylcarbamyl chloroacetamide (previously prepared from phenyl-N-methylcarbamate and 2-chloro-N-(hydroxymethyl)acetamide, 14.2 g. (0.07 M) of ammonium-O,O-diethylphosphorodithioate in 75 ml. of acetone, gave after reflux and work-up 20.3 g. (100 percent of theory) of a viscous liquid product, $n_D^{30}=$ 1.5485. Analysis for the title compound—calculated (percent): N, 6.90; S, 15.80; P, 7.60. Found (percent): N, 6.13; S, 14.64; P, 7.27.

EXAMPLE 3

Preparation of ethoxy-N-methylcarbamylmethyl-N-allyl-acetamido-O,O-diethylphosphorodithioate To 12.4 g. (0.05 M) of ethoxy-N-methylcarbamylmethyl-$N^1$-allyl chloroacetamide (previously prepared from ethyl-N-methylcarbamate and 2-chloro-N-(hydroxymethyl)-N-(allyl)acetamide in 75 ml. of benzene was added a neutral solution of aqueous potassium diethyldithiophosphate (0.08 M). The potassium diethyldithiophosphate was prepared from 14.9 g. (0.08 M) of diethyldithiophosphoric acid, 5.3 g. (0.08 M) of 85 percent potassium hydroxide and 25 ml. of water. The reaction mixture was stirred and refluxed for two hours and then cooled. The bottom aqueous layer was removed and the upper benzene layer was washed twice with dilute aqueous sodium chloride, dried over anhydrous magnesium sulfate, filtered and the solvent evaporated. There was obtained 17.8 g. (89.5 percent of theory) of the title compound, $n_D^{30}=$ 1.4997.

Analysis.—Calculated (percent): N, 7.05; S, 16.08; P, 7.79. Found (percent): N, 6.53; S, 15.26; P, 7.87.

EXAMPLE 4

Preparation of p-chlorophenylthioethyl-N-methylcarbamylmethylacetamido-O,O-dimethylphosphorodithioate To a mixture of 14 g. (0.04 M) of p-chlorophenylthioethyl-N-methylcarbamylmethyl chloroacetamide (previously prepared from p-chlorophenylthioethyl-N-methylcarbamate and 2-chloro-N-(hydroxymethyl)acetamide) and 75 ml. of methylethyl ketone was added with stirring 12.6 g. (0.08 M) of O,O-dimethyldithiophosphoric acid and 8.1 g. (0.08 M) of triethylamine. The reaction mixture was stirred and refluxed for one hour and then cooled to 25° C. It was washed with three 75 ml. portions of saturated aqueous sodium chloride. The organic layer was dried over anhydrous magnesium sulfate, filtered, and the solvent removed. There was obtained 18.5 g. (98 percent of theory) of the title compound, $n_D^{30}=1.5629$.

*Analysis.*—Calculated (percent): Cl, 7.50; N, 5.90; S, 20.30; P, 6.60; Found (percent): Cl, 8.03; N, 5.77; S, 20.31; P, 6.83.

The following is a table of the compounds prepared according to the aforedescribed procedures. Compound numbers have been assigned to each compound and are then used for identification throughout the balance of the application.

TABLE I $$RX\overset{O}{\overset{\|}{C}}N(R^1)CH_2\overset{O}{\overset{\|}{N}}(R^2)CCH_2SP\overset{Y}{\underset{R^4}{\nwarrow}}OR^3$$

| Compound No. | R | X | $R^1$ | $R^2$ | Y | $R^3$ | $R^4$ |
|---|---|---|---|---|---|---|---|
| 1[1] | $C_2H_5$ | O | H | H | S | $C_2H_5$ | $C_2H_5O$ |
| 2 | $C_2H_5$ | O | H | H | S | $CH_3$ | $CH_3O$ |
| 3[1] | Phenyl | O | $CH_3$ | H | S | $C_2H_5$ | $C_2H_5O$ |
| 4 | α-Naphthyl | O | $CH_3$ | H | S | $C_2H_5$ | $C_2H_5O$ |
| 5 | Phenyl | O | $CH_3$ | H | S | $CH_3$ | $CH_3O$ |
| 6 | α-Naphthyl | O | $CH_3$ | H | O | $C_2H_5$ | $C_2H_5O$ |
| 7 | do | O | $CH_3$ | H | S | $CH_3$ | $CH_3O$ |
| 8 | $C_2H_5$ | O | $CH_3$ | H | S | $C_2H_5$ | $C_2H_5O$ |
| 9 | $C_2H_5$ | O | $CH_3$ | H | S | $CH_3$ | $CH_3O$ |
| 10 | $C_2H_5$ | O | $CH_3$ | H | O | $C_2H_5$ | $C_2H_5O$ |
| 11 | $HC\equiv CCH_2$ | O | $CH_3$ | H | S | $i\text{-}C_3H_7$ | $i\text{-}C_3H_7O$ |
| 12 | $C_2H_5$ | O | $C_2H_5$ | H | S | $C_2H_5$ | $C_2H_5O$ |
| 13 | $i\text{-}C_3H_7$ | O | $CH_3$ | H | S | $C_2H_5$ | $C_2H_5O$ |
| 14 | $CH_3$ | O | $CH_3$ | H | S | $C_2H_5$ | $C_2H_5O$ |
| 15 | $C_2H_5$ | O | Phenyl | H | S | $C_2H_5$ | $C_2H_5O$ |
| 16[1] | $C_2H_5$ | O | $CH_3$ | $CH_2=CHCH_2$ | S | $C_2H_5$ | $C_2H_5O$ |
| 17 | $C_2H_5$ | O | $C_2H_5$ | H | S | $CH_3$ | $CH_3O$ |
| 18 | $C_2H_5$ | O | Phenyl | H | S | $CH_3$ | $CH_3O$ |
| 19 | $C_2H_5$ | O | H | $CH_3$ | S | $C_2H_5$ | $C_2H_5O$ |
| 20 | $CH_2=CHCH_2$ | O | $CH_3$ | H | S | $C_2H_5$ | $C_2H_5O$ |
| 21 | $CH_3$ | O | $CH_3$ | H | S | $CH_3$ | $CH_3O$ |
| 22 | $HC\equiv CCH_2$ | O | $CH_3$ | H | S | $CH_3$ | $CH_3O$ |
| 23 | $C_2H_5SCH_2CH_2$ | O | $CH_3$ | H | S | $C_2H_5$ | $C_2H_5O$ |
| 24 | $C_2H_5SCH_2CH_2$ | O | $C_2H_5$ | H | S | $C_2H_5$ | $C_2H_5O$ |
| 25 |  Cl–C₆H₄–SCH₂CH₂ | O | $C_2H_5$ | H | S | $C_2H_5$ | $C_2H_5O$ |
| 26 |  C₆H₅–SCH₂CH₂ | O | $C_2H_5$ | H | S | $C_2H_5$ | $C_2H_5O$ |
| 27 |  Naphthyl–SCH₂CH₂ | O | $C_2H_5$ | H | S | $C_2H_5$ | $C_2H_5O$ |
| 28 |  CH₃–C₆H₄–SCH₂CH₂ | O | $CH_3$ | H | S | $C_2H_5$ | $C_2H_5O$ |
| 29 |  C₆H₅–SCH₂CH₂ | O | $CH_3$ | H | S | $C_2H_5$ | $C_2H_5O$ |
| 30 | $C_2H_5SCH_2CH_2$ | O | $C_2H_5$ | H | S | $CH_3$ | $CH_3O$ |
| 31 |  Cl–C₆H₄–SCH₂CH₂ | O | $CH_3$ | H | S | $C_2H_5$ | $C_2H_5O$ |
| 32 | $C_2H_5SCH_2CH_2$ | O | $CH_3$ | H | S | $CH_3$ | $CH_3O$ |
| 33 |  Cl–C₆H₄–SCH₂CH₂ | O | $C_2H_5$ | H | S | $CH_3$ | $CH_3O$ |
| 34 |  C₆H₅–SCH₂CH₂ | O | $C_2H_5$ | H | S | $CH_3$ | $CH_3O$ |
| 35 |  C₆H₅–SCH₂CH₂ | O | $CH_3$ | H | S | $CH_3$ | $CH_3O$ |
| 36 |  Naphthyl–SCH₂CH₂ | O | $C_2H_5$ | H | S | $CH_3$ | $CH_3O$ |

Footnote at end of table.

TABLE I—Continued

| Compound No. | R | X | R¹ | R² | Y | R³ | R⁴ |
|---|---|---|---|---|---|---|---|
| 37 | CH₃–⟨⟩–SCH₂CH₂ | O | CH₃ | H | S | CH₃ | CH₃O |
| 38¹ | Cl–⟨⟩–SCH₂CH₂ | O | CH₃ | H | S | CH₃ | CH₃O |
| 39 | CH₃ | S | C₂H₅ | H | S | C₂H₅ | C₂H₅O |
| 40 | CH₃ | S | allyl | H | S | C₂H₅ | C₂H₅O |
| 41 | C₂H₅ | S | n-C₄H₉ | H | S | C₂H₅ | C₂H₅O |
| 42 | Phenyl | S | C₂H₅ | H | S | C₂H₅ | C₂H₅O |
| 43 | CH₃ | S | C₂H₅ | H | S | CH₃ | CH₃O |
| 44 | C₂H₅ | S | C₂H₅ | H | S | C₂H₅ | C₂H₅O |
| 45 | CH₃ | O | H | CH₃ | S | C₂H₅ | C₂H₅O |
| 46 | C₂H₅ | O | H | C₂H₅ | S | C₂H₅ | C₂H₅O |
| 47 | n-C₄H₉ | O | H | CH₃ | S | C₂H₅ | C₂H₅O |
| 48 | i-C₄H₉ | O | H | C₂H₅ | S | C₂H₅ | C₂H₅O |
| 49 | CH₃ | O | H | CH₃ | S | CH₃ | CH₃O |
| 50 | C₂H₅ | O | H | C₂H₅ | S | CH₃ | CH₃O |
| 51 | n-C₄H₉ | O | H | CH₃ | S | CH₃ | CH₃O |
| 52 | i-C₄H₉ | O | H | CH₃ | S | CH₃ | CH₃O |
| 53 | i-C₄H₉ | O | H | i-C₄H₉ | S | C₂H₅ | C₂H₅O |
| 54 | C₂H₅ | O | H | n-C₄H₉ | S | C₂H₅ | C₂H₅O |
| 55 | C₂H₅ | O | H | n-C₄H₉ | S | CH₃ | CH₃O |
| 56 | CH₃ | O | H | H | S | CH₃ | C₂H₅ |
| 57 | C₂H₅ | O | CH₃ | H | S | CH₃ | C₂H₅ |
| 58 | HC≡CCH₂ | O | CH₃ | H | S | CH₃ | C₂H₅ |
| 59 | C₂H₅ | O | H | n-C₄H₉ | S | CH₃ | C₂H₅ |
| 60 | Isobornyl | O | CH₃ | H | S | C₂H₅ | C₂H₅O |
| 61 | do | O | CH₃ | H | S | CH₃ | CH₃O |
| 62 | Bornyl | O | CH₃ | H | S | C₂H₅ | C₂H₅O |
| 63 | do | O | CH₃ | H | S | CH₃ | CH₃O |
| 64 | Cyclohexyl | O | CH₃ | H | S | C₂H₅ | C₂H₅O |
| 65 | CH₃O–⟨⟩ | O | CH₃ | H | S | C₂H₅ | C₂H₅O |
| 66 | NO₂–⟨⟩ | O | CH₃ | H | S | C₂H₅ | C₂H₅O |
| 67 | phthalimido-CH₂ | O | CH₃ | H | S | C₂H₅ | C₂H₅O |
| 68 | Cl–⟨Cl⟩–OCH₂CH₂ | O | CH₃ | H | S | C₂H₅ | C₂H₅O |
| 69 | CH₃OCH₂CH₂ | O | CH₃ | H | S | C₂H₅ | C₂H₅O |
| 70 | n-C₄H₉OCH₂CH₂ | O | CH₃ | H | S | C₂H₅ | C₂H₅O |
| 71 | C₂H₅OCH₂CH₂ | O | CH₃ | H | S | C₂H₅ | C₂H₅O |
| 72 | CH₃OCH(CH₃)CH₂CH₂ | O | CH₃ | H | S | C₂H₅ | C₂H₅O |
| 73 | Cl–⟨⟩–OCH₂CH₂ | O | CH₃ | H | S | C₂H₅ | C₂H₅O |

¹ No. 1 prepared in Example 1. No. 3 prepared in Example 2. No. 16 prepared in Example 3. No. 38 prepared in Example 4.

As previously mentioned, the herein described novel compositions prepared in the above-described manner are biologically active compounds which are useful and valuable in controlling various insects and acarid species. The compounds of this invention were tested as insecticides and acaricides in the following manner.

Insecticidal evaluation test.—The housefly *Musca domestica* (Linn.) was subjected to evaluation tests for insecticides incorporating the compounds of the present invention.

Twenty-five female flies, three to five days old, were caged in cardboard mailing tubes 3⅛″ in diameter 2⅝″ tall. The cages were supplied with cellophane bottoms and coarse mesh nylon tops. Each cage was provided with food and water. The candidate toxicant was dissolved in a volatile solvent, preferably acetone. The solution was pipetted into a petri dish bottom, allowed to air dry and placed in a cardboard mailing tube cage. The flies were continuously exposed to the known residue of the active compound in the cage. After twenty-four and forty-eight hours, counts were made to determine living and dead insects. The LD-50 values were calculated using well-known procedures. The results of this insecticidal evaluation test is given in Table II under HF.

The insect species black bean aphid—*Aphis fabae*—was also employed in the test for insecticidal activity. Young nasturtium plants were used as the host plants for the bean aphid. The host plant was infested with approximately 50 of the aphids. The test chemical was dissolved in acetone, added to water which contained a small amount of Sponto 221®, an emulsifying agent. The solution was applied as a spray to the infested plants. Concentrations ranged from 0.05 percent downward until an $LD_{50}$ value was achieved. These results are given in Table II under the column BA."

Acaricidal evaluation test.—The two-spotted mite, *Tetranychus telarius* (Linn.), was employed in tests for miticides. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221®, an emulsifying agent, the amount of water being sufficient to give concentrations of active ingredient ranging from 0.25% to 0.0008%. The test suspensions were then sprayed on the infested pinto bean plants. After seven days, mortalities of post-embryonic and ovicidal forms were determined. The percentage of kill was determined by comparison with control plants which had not been sprayed with the candidate compounds. The LD-50 value was calculated using well-known procedure. These values are reported under the columns "PE" and "Eggs" in Table II.

Systemic evaluation test.—This test evaluates the root absorption and upward translocation of the candidate systemic compound. The two-spotted mite, *Tetranychus telarius* (Linn.) and the bean aphid, *Aphis fabrae*, were employed in the test for systemic activity.

Young pinto bean plants in the primary leaf stage were used as host plants for the two-spotted mite. The pinto bean plants were placed in bottles containing 200 ml. of the test solution and held in place with cotton plugs. Only the roots were immersed. The test solutions were prepared by dissolving the compounds to be tested in a suitable solvent, usually acetone, and then diluting with distilled water. The final acetone concentration never exceeded about 1 percent. The toxicants were initially tested at a concentration of 10 parts per million (p.p.m.). Immediately after the host plant was placed in the test solution it was infested with the test species. Mortalities were determined after seven days.

Young nasturtium plants were used as the host plants for the bean aphid. The host plants were transplanted into one pound of soil that had been treated with the candidate compound. Immediately after planting in the treated soil the plants were infested with the aphids. Concentrations of toxicant in the soil ranged from 10 p.p.m. per pound of soil downward until an LD$_{50}$ value was obtained. Mortality was recorded after 72 hours.

The percentage of kill of each test species was determined by comparison with control plants placed in distilled water or untreated soil. The LD$_{50}$ values were calculated. These systemic test results are reported in Table II under the columns "SYS" for two-spotted mite systemic activity and "BAS" for the bean aphid systemic activity.

TABLE II

| Compound No. | HF (μg.) | Insecticidal activity | | Acaricidal activity, two-spotted mite | | |
|---|---|---|---|---|---|---|
| | | Bean Aphid | | | | |
| | | BA, percent | BAS (p.p.m.) | PE, percent | Eggs, percent | SYS (p.p.m.) |
| 1 | 25 | | | .001 | .008 | 1 |
| 2 | 10 | | | | >.05 | 0.75 |
| 3 | 25 | | | .007 | >.05 | >10 |
| 4 | [1].1 | | | | | |
| 5 | 10 | | | .03 | .03 | 7 |
| 8 | 10 | | | | | 3 |
| 9 | 8 | | | .005 | >.05 | 2 |
| 10 | 10 | | | .0007 | .007 | 5 |
| 12 | 25 | | | .001 | .01 | .05 |
| 13 | 8 | | | .005 | .03 | 2.5 |
| 14 | 25 | .008 | | .003 | .005 | 0.25 |
| 16 | 25 | | | .005 | .01 | 3 |
| 17 | 25 | | | .005 | .01 | 2 |
| 19 | 1.5 | .001 | | .003 | .005 | 1 |
| 20 | 25 | | | .003 | .005 | 2 |
| 21 | 10 | .001 | | .001 | .005 | 0.2 |
| 22 | 10 | .008 | | .001 | .003 | 0.2 |
| 23 | 100 | .008 | | .008 | .008 | 2.5 |
| 24 | | | | .03 | .03 | 5 |
| 25 | 100 | | | .05 | >.05 | 10 |
| 26 | 50 | | | .008 | .03 | |
| 29 | 25 | | | .03 | >.05 | 10 |
| 31 | 25 | | | .03 | .05 | |
| 39 | 35 | .003 | | .003 | .01 | 2 |
| 40 | 35 | .005 | | | | |
| 41 | 35 | .005 | | .01 | .05 | |
| 42 | 35 | .005 | | | | |
| 43 | 35 | .03 | >10 | .005 | .01 | 10 |
| 44 | 25 | .005 | 10 | .01 | .03 | 7 |
| 45 | 2.5 | .001 | 0.25 | .005 | .01 | 1 |
| 46 | 10 | .003 | 1 | .001 | .01 | 3 |
| 47 | 15 | .003 | 3 | .03 | | 5 |
| 48 | 10 | .003 | 0.5 | .005 | | 3 |
| 49 | 1 | .008 | 2.5 | | | 0.5 |
| 50 | 10 | .003 | | .005 | | 1 |
| 51 | 25 | .03 | | | | |
| 52 | 10 | .003 | 2.5 | | | 0.75 |
| 53 | 15 | .008 | | .05 | | 8 |
| 56 | 5 | .0008 | 5 | | | 0.75 |
| 57 | 2.5 | .003 | 5 | | | 3 |
| 58 | 15 | .003 | 5 | | | 3 |
| 59 | 3.5 | .0008 | 5 | | | 3 |
| 60 | [1].1 | | | | | |
| 64 | 25 | | | .05 | | |
| 66 | 10 | | | .001 | .01 | |
| 67 | 25 | | | .001 | .01 | |

[1] Percent.

In addition to the above presented data it was found that compounds number 21, 56, 57, 58 and 59 have an LD-50 value of 0.1 percent against spotted milkweed bug *Oncopeltus fasciatus* (Dallas)—and compounds 19 and 45 have an LD-50 of 0.005 percent against spotted milkweed bug. Salt-marsh caterpillar was effectively controlled at a concentration of 0.1 percent by compound number 10. Compound number 56 has an LD-50 of 0.1 percent against German cockroach—*Blatella germanica* (Linn.).

From these data it can be seen that the compounds of the instant application are valuable as insecticides and acaricides. In practice the compounds are usually formulated with an inert adjuvant, utilizing methods well-known to those skilled in the art, thereby making them suitable for application. They may be used in the form of emulsions, non-aqueous solutions, wettable powders, vapors, dusts, dyes and the like, as may be best fitted to the particular utility. The concentration of a compound of the present invention, constituting an effective amount, and the best mode of administration to an insect or acarid pest or its habitat may be easily determined by those skilled in the art of pest control. The disclosure is not meant to limit the action of the compounds to one particular insect or acarid species or mode of effect thereon.

We claim:

1. The method of killing insects and acarids comprising applying to the pest's habitat an insecticidally and acaricidally effective amount of a compound of the formula

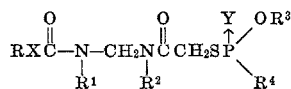

wherein X and Y are selected from the group consist- of oxygen and sulfur;
    wherein R is a member selected from the group consisting of lower alkyl, lower alkenyl, lower alkynyl, naphthyl, phenyl, substituted phenyl, wherein said substituents are selected from the group consisting of halogen, lower alkoxy, lower alkyl and nitro; bornyl, isobornyl, cyclohexyl, lower alkoxyalkyl, N-phthalimidomethyl and S-substituted - thioethyl wherein said substituents are selected from the group consisting of lower alkyl, phenyl, naphthyl, halophenyl and alkyl phenyl;
    wherein $R^1$ and $R^2$ are selected from the group consisting of hydrogen, lower alkyl, phenyl, lower alkenyl and lower alkynyl;
    wherein $R^3$ is lower alkyl and $R^4$ is lower alkoxy or lower alkyl.

2. The method of killing insects and acarids comprising applying to the pest habitat an insecticidally and acaricidally effective amount of the compound, ethoxycarbamylmethyl-N-methyl-O,O - diethylphosphorodithioyl acetamide.

3. The method of killing insects and acarids comprising applying to the pest habitat an insecticidally and acaricidally effective amount of the compound, methoxycarbamylmethyl - O,O-dimethylphosphorodithioyl acetamide.

4. The method of killing insects and acarids comprising applying to the pest habitat an insecticidally and acaricidally effective amount of the compound, propargyloxy-N-methylcarbamylmethyl - O,O - dimethylphosphorodithioyl acetamide.

5. The method of killing insects and acarids comprising applying to the pest habitat an insecticidally and acaricidally effective amount of the compound, methoxycarbamylmethyl - N-methyl-O,O - dimethylphosphorodithioyl acetamide.

6. The method of killing insects and acarids comprising applying to the pest habitat an insecticidally and acaricidally effective amount of the compound, methoxycabamylmethyl-O - methylethylphosphorodithioyl acetamide.

7. An insecticidal and acaricidal composition comprising an inert adjuvant and an insecticidally and acaricidally effective amount of a compound of the formula

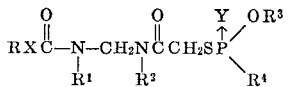

wherein X and Y are selected from the group consisting of oxygen and sulfur;
  wherein R is a member selected from the group consisting of lower alkyl, lower alkenyl, lower alkynyl, naphthyl, phenyl, substituted phenyl, wherein said substituents are selected from the group consisting of halogen, lower alkoxy, lower alkyl and nitro; bornyl, isobornyl, cyclohexyl, lower alkoxyalkyl, N-phthalimidomethyl and S-substituted-thioethyl wherein said substituents are selected from the group consisting of lower alkyl, phenyl, naphthyl, halophenyl and alkyl phenyl;
  wherein $R^1$ and $R^2$ are selected from the group consisting of hydrogen, lower alkyl, phenyl, lower alkenyl and lower alkynyl;
  wherein $R^3$ is lower alkyl and $R^4$ is lower alkoxy or lower alkyl.

8. An insecticidal and acaricidal composition comprising an inert adjuvant and an insecticidally and acaricidally effective amount of the compound, ethoxycarbamylmethyl-N-methyl-O,O - diethylphosphorodithioyl acetamide.

9. An insecticidal and acaricidal composition comprising an inert adjuvant and an insecticidally and acaricidally effective amount of the compound methoxycarbamylmethyl-O,O-dimethylphosphorodithioyl acetamide.

10. An insecticidal and acaricidal composition comprising an inert adjuvant and an insecticidally and acaricidally effective amount of the compound, propargyloxy-N-methylcarbamylmethyl-O,O - dimethylphosphorodithioyl acetamide.

11. An insecticidal and acaricidal composition comprising an inert adjuvant and an insecticidally and acaricidally effective amount of the compound, methoxycarbamylmethyl-N-methyl-O,O - dimethylphosphorodithioyl acetamide.

12. An insecticidal and acaricidal composition comprising an inert adjuvant and an insecticidally and acaricidally effective amount of the compound, methoxycarbamylmethyl-O-methylethylphosphonodithioyl acetamide.

References Cited

UNITED STATES PATENTS

| | | | |
|---|---|---|---|
| 2,494,126 | 1/1950 | Hoegberg | 424—211 |
| 2,864,849 | 12/1958 | Schrader | 424—211 |

ALBERT T. MEYERS, Primary Examiner

D. R. ORE, Assistant Examiner